United States Patent [19]

Tatebayashi

[11] 4,386,042

[45] May 31, 1983

[54] MOLDING OF SYNTHETIC RESIN ARTICLE HAVING A HARD COATING

[76] Inventor: Akinori Tatebayashi, 3-54-6, Yamada-Nishi, Suita City, Osaka, Japan

[21] Appl. No.: 266,503

[22] Filed: May 22, 1981

[30] Foreign Application Priority Data

Feb. 10, 1981 [JP] Japan ................................. 56-18668
Feb. 10, 1981 [JP] Japan ................................. 56-18669

[51] Int. Cl.³ .............................................. B29D 9/00
[52] U.S. Cl. .................................... 264/135; 264/1.7; 264/138; 264/152; 264/254; 264/261; 264/266
[58] Field of Search ................. 264/1.7, 135, 246, 1.4, 264/22, 25, 138, 152, 176 R, 247, 254, 261, 266

[56] References Cited

U.S. PATENT DOCUMENTS 2,481,809  9/1949  Barnes .................................. 264/1.7
3,117,053  1/1964  Lawrence et al. ..................... 264/135
3,451,838  6/1969  Burzynoki et al. .
3,812,074  5/1974  Oswitch et al. ....................... 264/255

FOREIGN PATENT DOCUMENTS 46-9679    3/1971  Japan .................................. 264/246
54-134762 10/1979  Japan .................................. 264/246

Primary Examiner—James B. Lowe
Attorney, Agent, or Firm—Armstrong, Nikaido, Marmelstein & Kubovcik

[57] ABSTRACT

Molded product and method for providing a desired surface-hardness for its surface by means of a simple molding technique through several steps comprising the cutting of a thermoplastic film or sheet to the same form as the exterior form of the product, the placing of the cut piece on a mold-cavity surface, and the injecting of a molten resin for formation of the product into the mold cavity under a high pressure. The thermoplastic film or sheet is subjected, in advance, to a hard-coating treatment on its surface and a curing treatment to cure the agent thereon thereby forming a hard-coating layer on the surface of the product.

11 Claims, 3 Drawing Figures

MOLDING OF SYNTHETIC RESIN ARTICLE HAVING A HARD COATING

BACKGROUND OF THE INVENTION

This invention relates to a molded product of synthetic resin. More particularly, it relates to a synthetic resin molded unit with a desired surface hardness and a method of making the same.

Synthetic resin molded products, for example thermoplastic molded parts, are widely used in many fields of industry for a wide variety of applications such as for structural components, articles used in household, business, daily life, and the like, since they may be easily produced. These thermoplastic molded parts are excellent in durability. However, when they are employed for uses such as transparent windows for meters or clocks, dust covers for record players or tape recorders, lenses of flash lights, transparent lenses or covers for automobile head and tail lights, a variety of mirrors, and the like, they are subject to abrasion on their exterior surface due to external elements such as dust which cause a deterioration in their appearance. More important, in cases where they are used for windows of meters, the scales and indicators may become unreadable after prolonged use. Similarly, in cases where they are employed for lenses, this abrasion causes a decrease of diffusion in the transmission of light, thus rendering such products useless. These disadvantages and deficiencies are evident in the case of conventional plastic molded parts, and until now, they have been unavoidable without additional manufacturing procedures. If these disadvantages and deficiencies are resolved, the durability life of such plastic molded parts can be extended, resulting in a great improvement in the value thereof, as well as an increase in the possibilities for expanded applications for molded plastics.

As an approach to eliminate such abrasion on the surfaces of plastic molded parts, the surfaces have been coated with a hard coating to improve their surface-hardness. Hard-coatings such as epoxy resin derivatives, acryl resin derivatives, amino resin derivatives, polysiloxane derivatives, and the like have been known for some time. Some of them have even been used in industry on a limited scale. Each of these hard coatings is, in fact, dissolved into a solvent and coated on an injection-molded part by spraying the solution or by immersing the molded part in the solution, so that a hard-coating layer, having a thickness ranging from a few microns to less than one hundred microns, is formed on the molded part. The resulting hard-coating layer on the molded part is then cured by means of heat or ultraviolet irradiation. Although this conventional coating process may improve surface-hardness, it has been undesirable for the industrial production of plastic molded parts requiring surface-hardness because it requires 3 steps, a molding step, a coating step and a curing step. Moreover, this process results in the following additional drawbacks:

(1) Numerous substandard products are created during the curing process 1.1 An injection molded-part invariably has molecular orientation and/or residual stress. The heat treatment used to cure the hard-coating layer on the surface of the molded part causes shrinkage deformation in the molded part due to changes in this molecular orientation and/or residual stress, leading to a change of the overall dimensions of the product. Cracks or crazings result and sub-standard products are produced.

1.2 The heat treatment used to cure the hard-coating layer on the surface of the molded part causes changes in dimensions of the molded part resulting in products, so that they do not conform to a required size or shape.

1.3 Since the plastic material used in the manufacture of the molded parts has a tendency to be charged with static electricity, as long as the conventional three-step technique is applied, it is very difficult to keep the molded part free from dust during the period between the molding process and the coating process. Accordingly, the coating on the surface of the molded part becomes uneven, thereby making it impossible to attain an even surface-hardness. Due to the above production problems resulting from the conventional 3-step technique, it has been found that the number of sub-standard units are about 10% when manufactured on an industrial scale.

(2) Lack of uniformity of surface-hardness 2.1 It is impossible to achieve a hard-coating layer having a uniform thickness on the surface of molded parts by means of the spray coating or the immersion-coating technique. The resulting surface layer lacks uniformity of its surface-thickness resulting in a lack of uniformity in surface-hardness. This is especially true where the molded part has caves or convexities on its surface, the thickness of the hard-coating layer becomes irregular so that its external appearance becomes extremely poor.

(3) Complications in the coating process 3.1 In cases where a hard-coating is only necessary on one surface of a molded part, the surface which is not to be coated must be masked while the other surface is being coated. When this non-coated surface has an irregular form or structure, the masking means used must be made to match this irregular form.

(4) High cost 4.1 Conveyance of the molded parts between the various steps is extremely expensive and labor consuming because of their packaging and bulkiness.

4.2 In the event that the place of production of the molded parts is different from the place in which the hard-coating treatment is conducted, unnecessary labor and expense is required in order to prevent the molded part from being damaged or subjected to dust during transport and/or storage before the hard-coating is applied.

4.3 In the event that the molded parts become contaminated by dust before the hard-coating is applied, unnecessary labor and expense is required to clean them before the hard-coating can be applied.

4.4 Coating equipment is very expensive since it must be equipped with a large scale baking-furnace, replaceable by one another depending on a shape of the molded part to be coated and necessary for each place of production of the molded parts.

4.5 In order to prevent dust from contaminating the molded part due to static electricity and to attain the aims of making a hard and even surface on the molded part, large scale equipment is required for purification of air and/or for maintaining a dust-free atmosphere during the coating process.

The abovementioned problems have been a major drawback to the use of surface-hardness treatment of the synthetic resin products such as plastic molded parts. Due to these disadvantages and deficiencies of the prior art, surface-hardness treatment of a variety of resin products has never conducted on an industrial scale.

SUMMARY OF THE INVENTION

The synthetic resin molded part with a hard-coating layer thereon and method of this invention overcome the above-discussed and numerous other disadvantages and deficiencies of the prior art and relate to a synthetic resin molded part with a desired surface-hardness and a method for preparation of the same comprising:

(1) cutting a thermoplastic film or sheet into approximately the same form as the exterior shape of the final synthetic resin molded part; the thermoplastic film or sheet having a hard-coating layer on its surface;

(2) placing the cut piece of the thermoplastic film or sheet on a cavity surface of the mold for making the molded-part;

(3) injecting, under a high pressure, a molten resin for the formation of the molded part from an injection molding means into the cavity; and (4) removing the molded part from the mold as a final product having the desired surface-hardness.

The thermoplastic film or sheet having the hard-coating layer on its surface is prepared by;

(1) molding the thermoplastic film or sheet of a desired thickness by means of a known extrusion molding-technique or the like;

(2) subjecting the thermoplastic film or sheet to a surface-treatment such as washing with water;

(3) subjecting the surface of the thermoplastic film or sheet to, if necessary, a pre-coating treatment;

(4) coating the pre-treated surface of the thermoplastic film or sheet with a hard coating;

(5) subjecting the hard coating on the surface of the thermoplastic film or sheet to a curing treatment so as to form the hard-coating layer thereon; and (6) if necessary, off-loading the film or sheet on to a roll whereby dust or other particles can be prevented from adhering to the surface of the film or sheet.

At least one shaped piece of the thermoplastic film or sheet which has a hard-coating layer on its surface is placed on the cavity surface in a manner such that its surface having the hard-coating layer thereon will result in one or both of the exterior surfaces of the final molded product.

Thus, the invention described herein makes possible the objectives of:

(a) providing a synthetic resin molded-part having uniform hardness on its surface;

(b) providing a method for preparation of a synthetic resin molded-part having a desired surface-hardness on an industrial scale and by a single technique;

(c) providing a resin molded-part having a desired surface-hardness and a method for preparation of the same without chance of sub-standard products being produced;

(d) providing a synthetic resin molded-part having a desired surface-hardness and a method for preparation of the same at low cost; and (e) providing a synthetic resin molded-part having a desired surface-hardness and a method for preparation of the same the surface layer of which can, if necessary, be treated so as to have ultraviolet-absorption properties and/or containing colored materials or the like without mixing those treatment materials with the molding materials.

BRIEF DESCRIPTION OF THE DRAWINGS

This invention may be better understood and its numerous objectives and advantages will become apparent to those skilled in the art by reference to the accompanying drawings as follows.

FIG. is a side view illustrating an embodiment of the molding process according to this invention.

DESCRIPTION OF THE PREFERRED EMBODIMENTS

Figure 1:
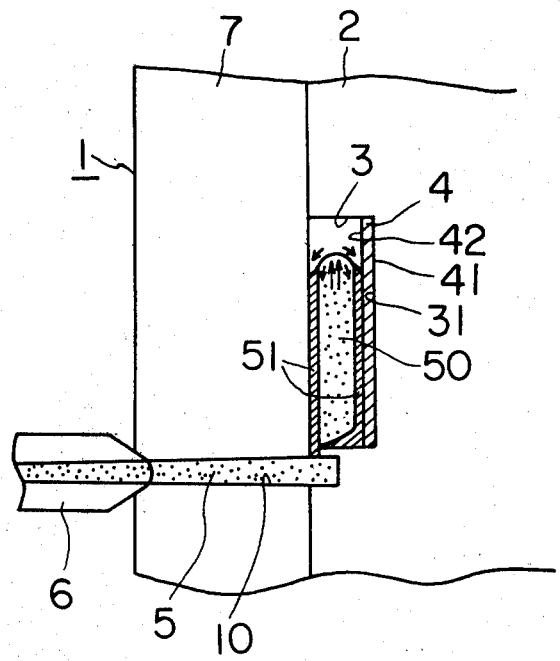
Figure 2:
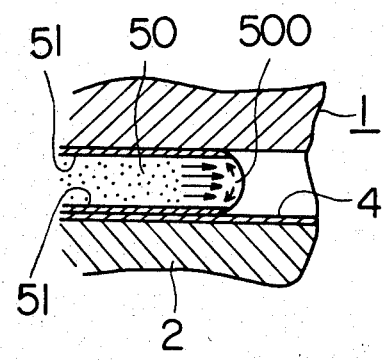
FIG. 2 is a partial enlarged sectional view showing the molding process of this invention.

A thermoplastic film or sheet which has as little molecular-orientation or residual stress as possible is first prepared by a known extrusion-molding technique or the like; the thermoplastic film or sheet having a pre-determined thickness. The thermoplastic film or sheet is then subjected to a surface treatment by washing with water or by purification after which its surface, the exterior or the interior, is subjected to a pre-coating treatment with a pre-coating agent. A hard coating of organic or inorganic derivatives of a given thickness is applied to the surface which has undergone the pre-coating treatment. This pre-coating treatment may be omitted depending upon the materials used for the thermoplastic film and the hard coating. Thereafter, the hard coating on the thermoplastic film or sheet is fully subjected to a curing treatment with ultraviolet light and/or heating by means of infrared rays or hot air. This cured thermoplastic film or sheet is preserved in, for example, a collar form.

The thermoplastic film or sheet is prepared from polymethylmetacrylate, MMA-styrenebutadiene copolymers, polycarbonate, polymethylpentene, saturated polyester film, polystyrene film, or the like. The thickness of the film or sheet depends on the degree of the surface-hardness required according to use of the final resin molded-product or the material used for the hard-coating. The thickness may be selected in the range of about $20\mu$ to about $2,000\mu$, more preferably about $50\mu$ to about $500\mu$. As the hard coating, substances such as acrylic resin derivatives, amino resin derivatives, polysiloxane derivatives, epoxy resin derivatives, or the like are employed. An example of acrylic resin derivatives is a reactant of a mixture consisting essentially of polyalcohol, polycarboxylic acid and methacrylic copolymer with modified styrene or acrylic acid, which is disclosed in Laid Open of Japanese Patent Application No. sho. 49-133491. An example of amino resin derivatives is a reactant of a mixture consisting essentially of alkoxymethylol melamine and nitrocellulose with polyalkyleneglycol or denatured polyalkylenegrycol, which is disclosed in Laid Open of Japanese Patent Application No. sho. 47-33164. An inorganic silicone of polysiloxane derivatives is, for example, a reaction mixture of poly methylethoxysilane with phenylethoxysilane, which is disclosed in U.S. Pat. No. 3,451,838; and an organic silicone thereof is, for example, a partial hydrolysis product of aminoalkylalkoxysilane and glicidylalkylalkoxysilane, which is disclosed in Laid Open of Japanese Patent Application No. sho 48-84878. The pre-coating treatment is performed by use of a pre-coating agent containing, for example, γ-aminopropylmethoxysilane, alcohol and water, or a heat-curing-type modified acryl resin solution when the thermoplastic film or sheet is prepared from polycarbonate.

The thermoplastic film or sheet having the hard-coating layer on its surface produced through the above-mentioned steps is, if necessary, transported to an injection-molding factory. The term "hard-coating layer" in the present invention means a cured layer formed on the surface of the resin molded-part necessary to improve its abrasion-resistance.

The transported thermoplastic film or sheet having the hard-coating layer is shaped to approximately the same form as or similar form to the exterior surface of the resin molded-part by means of a known cutting means. As shown in FIG. 1, a mold 1 for making a desired resin molded-part is opened by moving a part 2 of the mold 1 to place the shaped piece 4 of the film or sheet on the cavity surface 31 in such a manner that its surface 41 having the hard-coating layer thereon will result in the exterior surface of the final resin molded-part. Another shaped piece may be, if necessary, also placed on the other cavity surface in such a manner that its surface having the hard-coating layer thereon will likewise result in the interior surface of the resin molded-part. Upon holding the shaped piece 4 on the cavity surface 31 by utilizing, for example, convexes on the cavity surface, the movable part 2 of the mold 1 is closed. A molten resin 5 is then injected, under a high pressure ranging from about 500 to about 3,000 kg/cm$^2$, from an injection-molding means 6 such as an injection nozzle into the cavity 3 in such a manner that the surface 41 having the hard-coating layer thereon will result in the exterior surface of the final molded-part and that the un-coated surface 42 becomes the interior of the final molded-part. The molten resin is preferably the same kind or type of thermoplastic as the thermoplastic film or sheet.

The injected molten-resin 5 enters into the cavity 3 through a sprue 10 and forms solid layer 51 on both the cavity surface 31 and the shaped piece 4 as the molten resin 50 is cooled by contact with the cavity surface 31 and the shaped piece 4. This solid layer 51 adheres to both the cavity surface 31 and the un-coated surface 42 of the shaped piece 4. The interior of the molten-resin flow 50 surrounded by the solid layer 51 flows in a forward manner through solid layer 51 due to the injection pressure. Consequently, the desired form of the plastic film or sheet of the shaped piece 4 is accomplished instantaneously in conformance with the cavity-surface form without any sliding or shifting from its initial position. On the other hand, the un-coated surface 42 of the plastic film or sheet is melted by heat from the molten resin 50. Since the un-coated surface 42 of the plastic film or sheet is of the same type of resin as the molten resin 50, both are melted together through the interface 42. Thus, the shaped piece 4 and the molten resin 50 are perfectly united at the interface 42.

After cooling, the molded-part is taken out of the mold 1. The desired portion of the resulting molded-part is completely covered by the hard-coating layer. Post-treatment is not required for the molded part. It is also possible to place the shaped pieces 4 on the cavity surface 31 in such a manner that the hard-coating layer thereof will be produced on both the exterior and interior faces of the final molded-part.

As molding equipment for the production of the molded product, a well-known injection-molding means and standard mold can be used; no additional equipment or metal molds with particular structures are required.

In the event that the plastic film or sheet is the same type as the molten resin, as mentioned above, they will be united at the interface 42 through melting process utilizing heat from the molten resin. In the event that they are of a different kind of resin, they can be united by means of an adhesive which is applied in advance to the un-coated surface 42 of the plastic film or sheet. Adhesives such as elastomer-type adhesives consisting essentially of polyvinyl butyral, elastomer-type adhesives of copolymer of acrylic acid-butadiene-acrylonitrile derivatives, or the like can be used. If desired, it is possible to add a color by a mixture of the desired coloring material into the plastic film or sheet before the hard-coating is applied. It is also possible for the molded part to have ultraviolet-absorption capabilities by mixing an ultraviolet-absorption material into the plastic film or sheet before the hard-coating is applied.

The following examples illustrate the process described herein. They have been carried out and have provided excellent results.

EXAMPLE 1

(A method for production of the thermoplastic film or sheet having a hard-coating layer formed thereon.)

Figure 3:
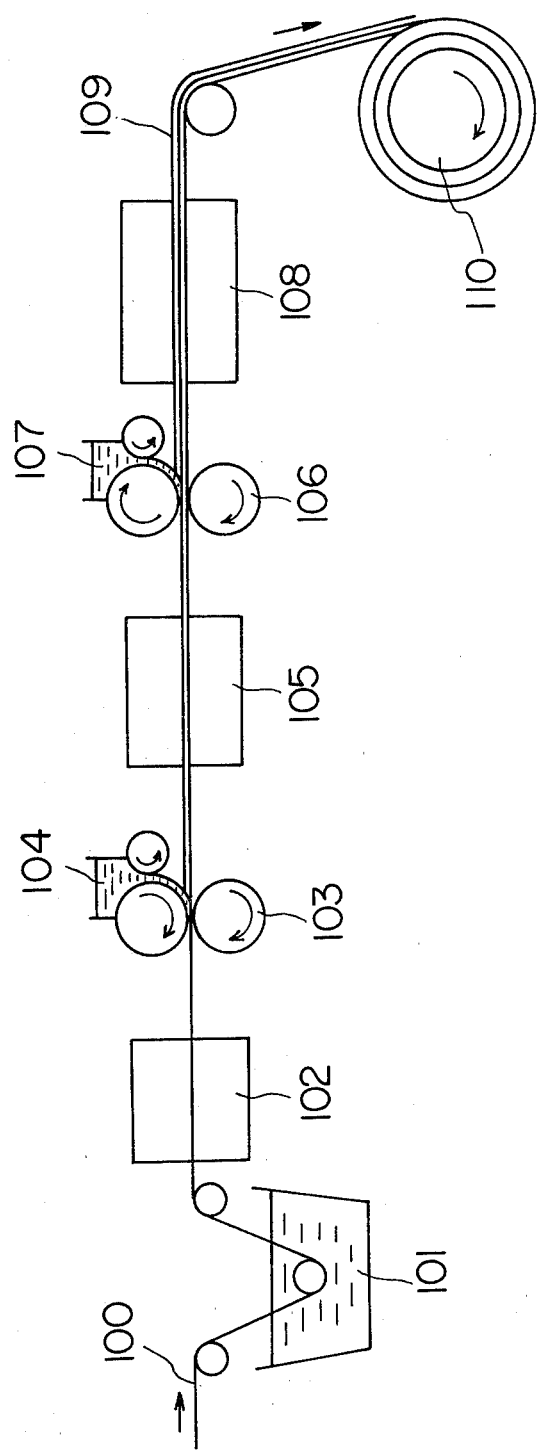
FIG. 3 is a flow diagram of an embodiment of the preparation of a thermoplastic film or sheet according to this invention.

As shown in FIG. 3, a polycarbonate film 100, which was molded to have a given uniform thickness (100$\mu$) by an extrusion-molding technique, was cleaned in a cleaning tank 101. In the cleaning tank 101, a cleansing and/or activation treatment of the film was performed. For example, the tank 101 was sectioned or enlarged so as to treat the film-surface by means of a chromic sulfite treatment, washing with water, or the like. The film 100 was then dried by a drying means 102. An under-coating agent 104, a primer (prepared by methyl acrylate, ethyl acrylate, $\alpha$-metacryloxypropyltriethoxysilane and BPO disclosed in e.g., Laid Open of Japanese Patent Application No. 50-116600), a pretreating agent of acryl derivatives, or the like, was applied to the film 100 by an under-coat rollcoater 103. The under-coating agent-coated-film was instantly dried by another drying means 105. On one face of the film, a hard-coating agent 107 was then coated with a thickness of about 2$\mu$ to 10$\mu$ by another rollcoater 106 as a hard-coating agent. As the hard-coating agent 107, a partial hydrolyzate was employed which is disclosed in the abovementioned Japanese Patent Application No. 50-116600 which is prepared by the addition of acid to a mixture of methyltrimethoxysilane, tetraethoxysilane, and a derivative in which the end-group is dimethylsiloxane. Thereafter, the film was heat-treated at a temperature of about 130° C. for 1 hour within another drying means 108 resulting in a film 109 having the desired hard-coating layer thereon. The resulting film 109 was successively rolled on a reel 110. The uniform hard-coating layer having the desired thickness was formed on the film 109 since the film 109 was prepared through a continuous coating-process in which the hard-coating agent 107 was coated on the film 100. The above drying means 108 may be selected according to the kind of the hard-coating agent; for example, an ultraviolet bath was used for the ultraviolet curing-type hard-coating agents and a hot air bath, an infrared ray bath or a far-infrared ray bath was employed for the silane derivative hard-coating agents.

EXAMPLE 2

(A method for production of a plastic molded-part having the desired surface-hardness.)

The film having the hard-coating layer thereon as prepared in Example 1 was cut in a circular form with a diameter of 50 mm. The cut circular-piece was placed on the cavity surface of an injection-molding mold for molding a lens with a diameter of 50 mm in such a manner that the hard-coating layer on the piece resulted in the exterior surface of the final molded-lens. Then, a molten-resin material of polycarbonate was injected, under a high pressure, into the abovementioned cavity by means of an injection-molding means under common molding conditions. After cooled, the molded lens was taken out of the mold. The result was an excellent product in which the hard-coating layer and the molding-resin material were completely incorporated and its border line could not be recognized. Moreover, the hard-coating layer on the exterior surface of the plastic molded-lens had a good appearance. It also had such an excellent surface-hardness that its surface sustained no abrasion even though scrubbed with a metal wool. The cost of production for the molded lens was about a half amount of lenses molded by the conventional molding technique.

EXAMPLE 3

A film having a hard-coating layer thereon as prepared in Example 1 was cut in two circular forms of 50 mm in diameter. The same mold as that in Example 2 was used. The cut circular-pieces were placed on the cavity surface 3 extending from the movable part 2 of the mold 1 to the fixed part 7 thereof in such a manner that each hard-coating layer on the cut pieces corresponded to the exterior (or the interior) surface of the final molded-lens. The molten-resin material of polycarbonate was injected between those two pieces under a high pressure. After being cooled, the molded lens was taken out. The result was a perfect hard-surface lens having hard-coating layers on both surfaces thereof and being excellent in an scratch-resistance.

EXAMPLE 4

Polymethylmetacrylate film of a thickness of 200μ was washed with water, using the equipment shown in FIG. 3, and coated on one surface thereof with a hard coating (a reactant consisting of 15 parts by volume of γ-glycidoxypropyl trimethoxysilane, 30 parts by volume of N-β-aminoethyl-Γ-aminopropyl trimethoxysilane, 10 parts by volume of polyethylenglycoldiglycidylether, 0.03 parts by volume of perchloric acid, 10 parts by volume of water and 50 parts by volume of dioxane, which is disclosed in Laid Open of Japanese Patent Application No. sho.54-129099). The hard coating on the film was cured with a heat-treatment at a temperature of 110° C. for 1 hour to yield a hard-coating layer. The resulting film having the hard-coating layer thereon was put on the cavity surface of the mold used in Example 2, after cutting it into the given shape, in such a manner that the hard-coating layer corresponded to the exterior surface of the final molded-part. Thereafter, polymethylmetacrylate molten resin was injected into the cavity under a high pressure. After being cooled, the molded part was taken out. The result was that a lustrous and an excellent scratch-resistant hard-coating layer had been formed on the desired exterior surface of the molded part.

EXAMPLE 5

A coloring material, e.g. 5/10,000 parts by weight of OPLAS YELLOW F145 (produced by Orient Chemical Ind. Ltd., Japan) was mixed into the plastic film of Example 4, in advance, to obtain a transparent yellow color. Through the same steps as in Example 4, a molded lens was obtained which had the properties of a yellow colored lens, even though the molding resin-material was colorless and transparent.

EXAMPLE 6

An ultraviolet ray-absorption material, 0.05 percent by weight 4-methoxy-2-hydroxybenzophenone, was mixed into the plastic film as prepared in Example 4 and a molded part was made according to the same technique as in Example 4. Even though the molding resin-material was colorless and transparent and had no additive, the resulting molded-part did not change color even through it was subjected to ultraviolet irradiation for as long as 200 hrs by means of a Sunshine Weathero Meter. Although the metal mold was repeatedly used, it did not suffer corrosion as would have occured in the conventional art due to mixing of such ultraviolet ray-absorption material.

EXAMPLE 7

An MMA-styrene-butadiene copolymer resin film of a thickness of 500μ was washed with water and treated with chromic sulfate at a temperature of 50° C. for 5 min. Thereafter, it was coated on one surface thereof by an acryl derivative hard-coating (produced by Fujikura Kasei Company, Japan) with a thickness of about 20μ and subjected to ultraviolet irradiation of 20 w/cm for 3 minutes to cure the hard-coating, thereby obtaining a film having the desired hard-coating layer thereon. The resulting film having the hard-coating layer was cut in accordance with the size of the mold cavity for a meter panel. The cut piece of film was placed on the cavity in such a manner that the hard-coating layer on the cut piece of film was positioned on the exterior surface of the molded part. Polystyrene was then injected. After being cooled, the molded part was taken out. The results showed that the product had an excellent abrasion-resistance and surface-condition.

EXAMPLE 8

A molded meter panel was made through the same steps as in Example 7. MBS copolymer was used as the molten resin-material instead of polystyrene as in Example 7. The resulting molded meter panel had nearly the same excellent abrasion-resistance and surface-condition as one obtained in Example 7.

Example 9

The un-coated surface of the film as prepared from MMA-styrenebutadiene copolymer as in Example 7 was coated with an elastomer adhesive consisting essentially of polyvinylbutylal thereon and cut in accordance with the size of the metal-mold cavity as used in Example 7. The cut piece of film was put on the cavity surface in such a manner that the hard-coating layer on the film was positioned on the exterior surface of the molded part and the coated adhesive on the un-coated surface was positioned on the backside of the molded part. A molded meter panel was made according to the same technique as in Example 7 except using polymethyl pentene as a molding resin material. The film having the hard-coating layer thereon completely adhered to the resulting molded meter panel by means of the adhesive. The molded panel surface had the same excellent scratch-resistance as in the foregoing examples.

EXAMPLE 10

ABS copolymer, AS and nylon were, respectively, tried as a molding resin-material instead of the polymethyl pentene in Example 9. The film having the hard-coating layer thereon completely adhered, as in Example 9, to the obtained molded meter panel, the surface of which had an excellent abrasion-resistance.

EXAMPLE 11

Instead of the butylal-derivative adhesive such as was used in Example 9, a pressure-sensitive elastomer adhesive of acrylic acid-butadiene-acrylonitrile copolymer was applied to the un-coated surface of the plastic film. As a molding resin-material, polystyrene, ABS copolymer and nylon were, respectively, used. The film having the hard-coating layer thereon likewise completely adhered, by means of the adhesive, to the molded meter panel, the exterior surface of which had an excellent abrasion-resistance.

The advantages attained by the present invention are as follows:

(1) Simple Techniques 1.1 The present invention is based on such a simple technique that a plastic film or sheet having a hard-coating layer thereon is placed on a metal-mold cavity for molding molded-parts and a molten resin-material is injected into the cavity, thereby obtaining the desired molded-part.

1.2 The plastic film or sheet is mainly produced by an extrusion-molding technique; thus, it is very easy to produce films or sheets having little molecular orientation or residual stress.

1.3 It is not necessary to carry out masking, which is usually troublesome, for a portion of the molded part on which surface-hardness treatment is not required.

(2) Low Ratio of Sub-standard Products 2.1 The technique of the present invention is so simple that the desired product can be obtained without special skill.

2.2 Cracks do not occur in the plastic film or sheet in the coating step of the hard coating, because, as described in item 1.2, it has little molecular orientation or residual stress. The curing temperature of the hard-coating may be raised to quickly produce hard-coating layers of good quality by selecting a plastic film or sheet of much higher molecular weight than the injection molded articles.

2.3 No change in dimensions occurs in the molded part even though some degree of molecular orientation or residual stress exist there, because the heat-treatment step is not required, as is necessary with the prior art; therefore, neither cracks nor deformation nor shrinkage occurs in the molded part.

2.4 The resulting molded-part can without fail be used in conjunction with other structural components because there are no changes of dimension therein.

2.5 The presence of dust never leads to defects in the final molded part.

2.6 The molded part has a uniform surface-hardness in spite of the presence of possible curvature thereon, because the plastic film or sheet can be subjected to a complete heat-forming process in accordance with the desired form of the metal-mold cavity within the metal mold.

(3) Uniformity of Surface-Hardness 3.1 Since the coating process can be continuously performed, the desired hard-coating layer of uniform thickness can be prepared.

3.2 The film or sheet having the hard-coating layer of uniform thickness unites with the molding resin-material within the metal mold in such a manner that the hard-coating layer is positioned on the exterior surface of the molded part, so that the resulting molded-part has a uniform hardness on its surface.

3.3 The molded part has a uniform surface-hardness in spite of the presence of possible curvature thereon, because the plastic film or sheet can be subjected to a complete heat-forming process in accordance with the desired form of the metal mold cavity within the metal mold.

(4) Low Cost 4.1 The cost of production can be decreased because the continuous coating step, which is very easy in process-management, is adapted to the coating-treatment of the plastic film or sheet.

4.2 In contrast with molded parts according to the prior art, transportation of the molded part to a separate molding location is unnecessary, although transportation of the coated film or sheet might be required. However, by comparison, the volume of film or sheet is much less than the corresponding volume of molded parts, thus decreasing the cost and labor needed for transportation greatly. Moreover, it is unnecessary to employ special transportation or cleaning procedures to prevent dust from causing defects in the final product.

4.3 By mixing additives such as coloring materials or ultraviolet absorption-materials into the plastic film or sheet in advance, the metal mold does not corrode, which often happens when such additives are added to the molding resin-materials. Accordingly, the life of the metal mold is increased, thereby decreasing the cost of production of the final molded-part. In addition, changing the color of the molten resin-materials in the mold is not required, which is often troublesome.

(5) Production On An Industrial Scale 5.1 It is extremely easy to produce the molded parts having the desired surface-hardness thereon on an industrial scale, as seen from the abovementioned items (1) through (4).

(6) Others 6.1 Strength and other physicochemical properties may be improved by using plastic films or sheet of high molecular weight.

6.2 The whole or part of the molded part may be colored by adding a coloring material to the plastic film in advance of the coating process.

6.3 It is possible to give the molded part ultraviolet absorption-capabilities by mixing ultraviolet absorption-materials into the plastic film in advance of the coating process.

6.4 It is possible to produce the molded part, wherein the types of resin used in plastic film and the molding resin are different from each other.

6.5 By coating the un-coated surface of the plastic-film with a proper adhesive, any molded part can be produced wherein the plastic film or sheet is different in resin materials from the molding resin.

6.6 Any kind of hard coatings can be adapted to the plastic films or sheets according to the present invention.

I claim:

1. A method for preparation of a molded product having a desired surface-hardness on its surface, comprising:
   (1) cutting a polycarbonate film or sheet into substantially the same form as or similar form to the exterior shape, to be hard-coated thereon, of the synthetic resin molded product; the film or sheet having a silane derivative or acrylic resin derivative hard-coating layer on its surface;
   (2) placing the cut piece of the polycarbonate film or sheet on a cavity surface of the mold for making the molded-product;
   (3) injecting under a high pressure a molten thermoplastic resin for the formation of the molded product from an injection molding means into the cavity by means of a high pressure injection molding technique; and
   (4) removing the molded product from the mold as a final product having the desired surface-hardness.

2. A method as in claim 1, wherein, in step (2), the cut piece is placed on the cavity surface in a manner such that its surface having the hard-coating layer thereon results in the exterior surface of the synthetic resin molded-product.

3. A method as in claim 1, wherein, in step (2), the cut pieces are placed on the cavity surface in a manner such that each hard-coating layer on the cut pieces corresponds to the exterior or the interior surface of the synthetic resin molded-product.

4. A method as in claim 1, wherein the polycarbonate film or sheet having a silane derivative hard-coating layer on its surface is prepared by:
   (1) providing the polycarbonate film or sheet of a desired thickness by means of an extrusion molding-technique;
   (2) subjecting the polycarbonate film or sheet to a surface-treatment;
   (3) subjecting the surface of the polycarbonate film or sheet to a pre-coating treatment so as to apply an undercoating agent of acryl derivative thereto;
   (4) coating the pre-treated surface of the polycarbonate film or sheet with a silane derivative hard-coating; and
   (5) subjecting the silane derivative hard-coating on the surface of the polycarbonate film or sheet to a curing treatment so as to form the silane derivative hard-coating layer thereon.

5. A method as in claim 4, further including off-loading the film or sheet onto a roll whereby dust or other particles can be prevented from adhering to the surface of the film or sheet.

6. A method as in claim 1, wherein the molded product is colored by adding a desired coloring material into the polycarbonate film or sheet.

7. A method as in claim 1, wherein the molded product has ultraviolet ray absorption-properties provided by mixing an ultraviolet ray absorption-material into the polycarbonate film or sheet.

8. A method as in claim 1, wherein the molded product is made from the same material as the polycarbonate film or sheet.

9. A method as in claim 1, wherein the molded-product materials are different from polycarbonate film or sheet materials.

10. A method as in claim 1, wherein the polycarbonate film or sheet having an acrylic resin derivative hard-coating layer on its surface is prepared by:
    (1) providing the polycarbonate film or sheet of a desired thickness by means of an extrusion molding-technique;
    (2) subjecting the film or sheet to a surface-treatment;
    (3) coating the pre-treated surface of the film or sheet with an acrylic resin derivative hard coating; and
    (4) subjecting the acrylic resin derivative hard coating on the surface of the film or sheet to a curing treatment so as to form the acrylic resin derivative hard-coating layer thereon.

11. A method as in claim 10, further including off-loading the film or sheet onto a roll whereby dust or other particles can be prevented from adhering to the surface of the film or sheet.

* * * * *